Feb. 24, 1931. G. C. PEARSON 1,793,868
TOOL RETAINER
Filed Oct. 27, 1928 2 Sheets-Sheet 1
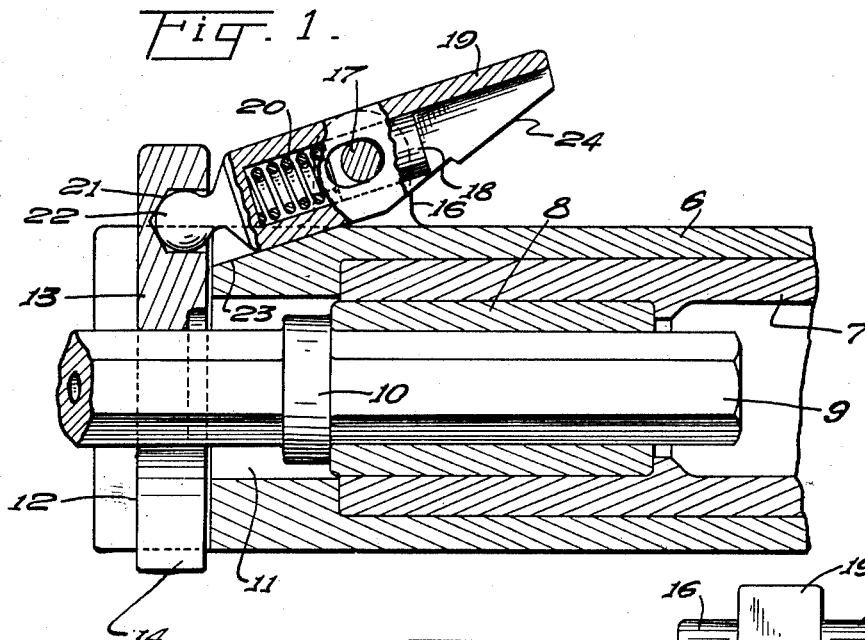
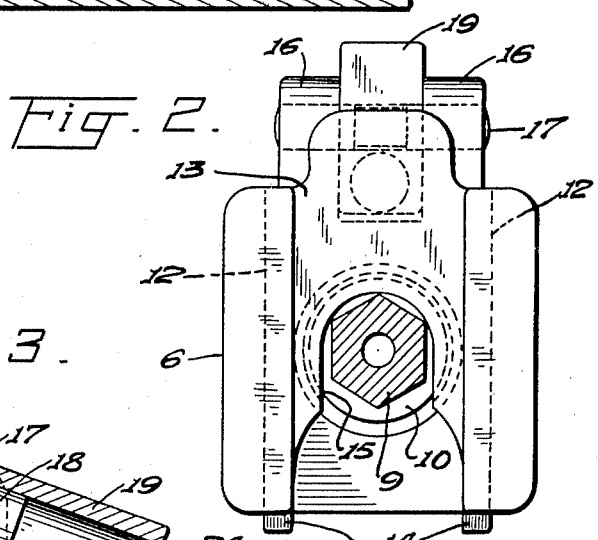
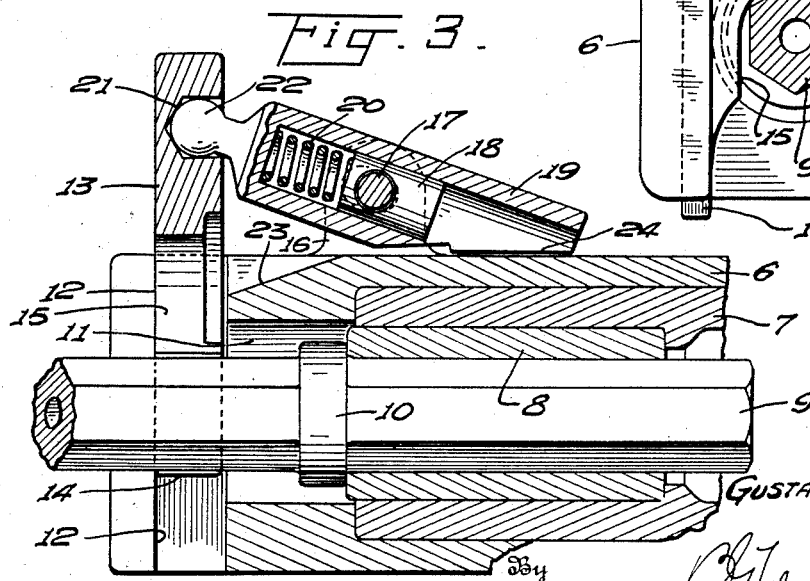
Inventor
GUSTAV C. PEARSON
Attorney Feb. 24, 1931. G. C. PEARSON 1,793,868
TOOL RETAINER
Filed Oct. 27, 1928 2 Sheets-Sheet 2
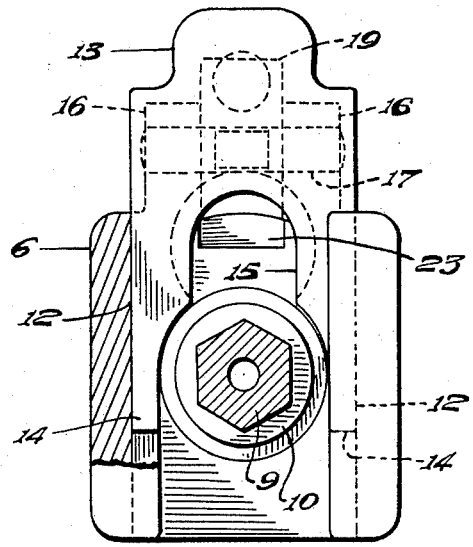
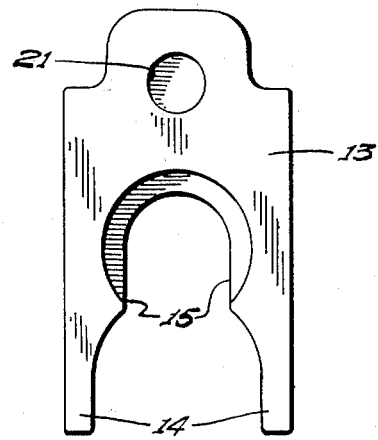
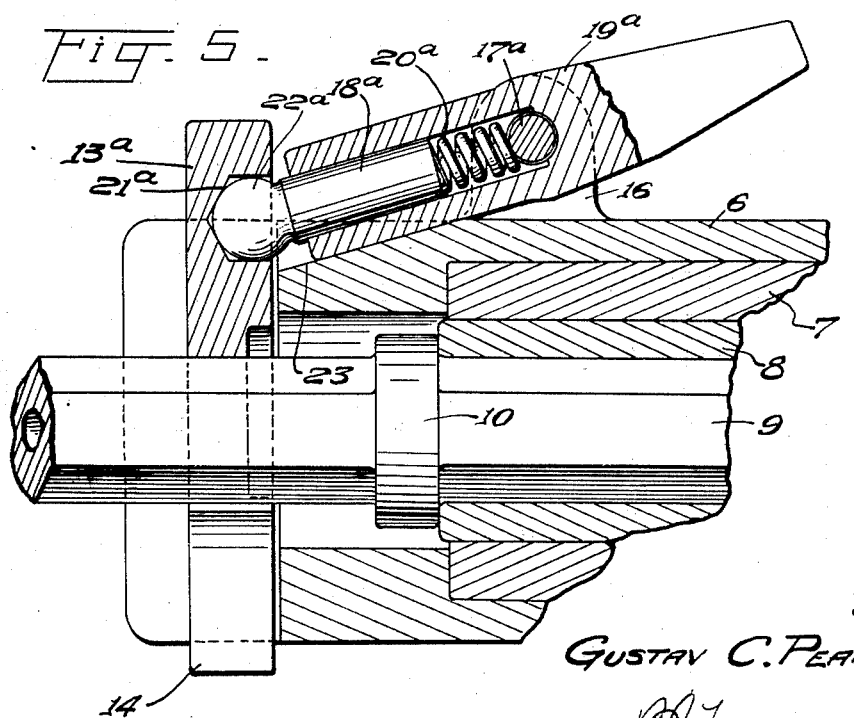
Inventor
GUSTAV C. PEARSON
By
Attorney Patented Feb. 24, 1931

1,793,868

UNITED STATES PATENT OFFICE

GUSTAV C. PEARSON, OF DENVER, COLORADO, ASSIGNOR TO GARDNER-DENVER COMPANY, OF DENVER, COLORADO, A CORPORATION OF DELAWARE

TOOL RETAINER

Application filed October 27, 1928. Serial No. 315,756.

The object of the present invention is to provide a simple, compact and efficient tool retainer that is preferably mounted directly in the chuck housing and is movable to and from a position to retain the shank end of a tool in the chuck, means being provided for actuating the retainer to and from its active position, and for holding it both in its active and in its inactive position.

In the accompanying drawings:

Figure 1 is a longitudinal sectional view through the chuck end of a drill structure, showing the preferred embodiment of the invention, in its active or tool-retaining position.

Figure 2 is a front elevation of the same.

Figure 3 is a longitudinal sectional view showing the retainer in its inactive position.

Figure 4 is a front elevation of the mechanism when arranged as shown in Figure 3.

Figure 5 is a longitudinal sectional view through a modified form of construction.

Figure 6 is a face view of the retaining yoke.

In the embodiment disclosed, the tool holder consists of a housing 6 containing a chuck 7, said housing and chuck together having a socket 8 for the reception of the shank or collared end 9 of a steel. The collar of such steel is illustrated at 10. The housing 6 projects beyond the front end of the chuck 7, forming a chamber 11 and said housing is provided at the front end of said chamber with oppositely disposed transverse guideways 12. A reciprocatory retaining yoke 13 has spaced legs 14 slidably mounted in said guideways. The space between these legs at their upper ends is reduced as shown at 15 so that the distance between these portions is less than the diameter of the collar 10 of the steel. The lower ends of the legs, however, are spaced apart a distance greater than the diameter of said collar 10.

Obviously therefore if the retainer is moved outwardly, the shank of the tool can be introduced into the socket of the tool holder and the collar 10 will be located in the chamber 11. If now the retainer is moved inwardly, the thickened portions of the legs will be in advance of the collar and in the path of the same, so that while it is permitted to have a limited movement, the tool cannot become detached from the tool holder.

Formed upon one side of the housing 6 behind the closed end of the retaining yoke 13 are spaced ears 16 connected by a pivot pin 17 and on this pin is fulcrumed an actuating lever. The lever consists of two sections, a plunger section 18 that is journaled on the pivot pin 17 and a swinging and reciprocating lever section 19 that is slidable upon the plunger section 18. The section 19 is chambered to slidably receive the section 18, and interposed between the bottom of the said chamber and the inner end of the section 18 is a coiled spring 20 that urges the lever section 19 toward the projecting end of the yoke 13. This end is provided in its rear side with a socket 21 and the lever section 19 is provided with a ball 22 engaged in said socket and constituting a pivotal connection between the lever section 19 and the yoke 13.

When the yoke 13 is in its active position, as shown in Figures 1 and 2, it will be noted that the lever 18—19 inclines inwardly. Its inward movement is limited by an inclined stop face 23 formed on the housing. This position of the lever and the action of the spring 20 serves to hold the yoke 13 in its operative position. If now the outer arm of the lever is pushed toward the housing, said lever will be swung and the yoke moved outwardly to its inoperative position, or that shown in Figures 3 and 4. The tool is now released and the yoke will be held in its inactive position by reason of the action of the spring 20 urging the lever section 19 outwardly. The movement of the lever is in this instance limited by the outer end of the lever section 19, whose rear surface is beveled as shown at 24 which surface abuts the housing.

With this structure it will be evident that the tool retaining yoke 13 can be readily moved by the actuating lever and when said lever has passed a "dead center", with the axes of the pivot 17 and ball 22 at their nearest points, the lever and spring then cooperate to continue the movement of the retaining yoke, either to its operative or to its inoperative position and to hold it in such position.

A modification of the invention is illustrated in Figure 5. The tool holder being the same as that already described, the parts thereof are given the same reference numerals as in the above described embodiment. The retainer yoke 13a is also as above described. The actuating lever in this case, however, consists of a lever member 19a that is fulcrumed directly on the pivot 17a and is provided in the end adjacent the yoke 13a with a plunger section 18a that is slidable therein, and is pressed outwardly by a spring 20a. The same ball and socket connection 21a, 22a is employed between this plunger section and the yoke.

The structure obviously operates the same as that above described and has substantially the same advantageous features.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with a tool holder housing having a socket for the reception of the collared portion of a tool, of a retainer yoke mounted in the front end of the body and including a yoke having side arms movable transversely at the front end of the socket and to and from a position in the path of the collar of such tool, and a swinging actuating device mounted on the exterior of the holder and having a movable connection with one end of the retainer.

2. The combination with a tool holder housing having a socket for the reception of the collared portion of a tool and a transverse guideway in and forming a part of its front end and at the front end of the socket, of a reciprocatory retainer slidably mounted in the guideway of the holder and movable transversely of the socket and to and from a position in the path of the collar of such tool, and a swinging actuating device pivotally mounted on the holder and having a movable connection with the retainer.

3. The combination with a tool holder having a socket for the reception of the collared portion of a tool, of a retainer movable transversely of the socket and to and from a position in the path of the collar of such tool, a swinging actuating device mounted on the holder and having a movable connection with the retainer, and spring means housed within the actuating device for holding the retainer in active and inactive positions.

4. The combination with a tool holder having a socket for the reception of the collared portion of a tool, of a reciprocatory retainer slidably mounted on the holder and movable transversely of the socket and to and from a position in the path of the collar of such tool, and a swinging actuating device mounted on the holder and having a movable connection with the retainer, said actuating device comprising relatively movable devices that together swing and having means for relatively moving them and thereby holding the retainer in its active position and in its inactive position.

5. The combination with a tool holder having a socket for the reception of the collared portion of a tool, and a transverse guideway formed on the holder at the front end of said socket, of a tool retainer slidably mounted in the socket, and a swinging actuating lever fulcrumed on the tool holder and having a spring pressed portion slidably mounted thereon and pivotally engaged with the retainer.

6. The combination with a tool holder having a socket for the reception of the collared portion of a tool and a transverse guideway at the front end of said socket, of a tool retainer slidably mounted in the socket, a pivot, a lever comprising sections, one of which is mounted on the pivot, the other section being slidably engaged with the first section and having a pivotal bearing in the retainer, and a spring interposed between the sections, said pivotal bearing being movable to positions on opposite sides of a central "dead line" position with the pivot.

In testimony whereof, I affix my signature.

GUSTAV C. PEARSON.